(12) United States Patent
Smith et al.

(10) Patent No.: US 8,610,411 B2
(45) Date of Patent: Dec. 17, 2013

(54) HIGH-VOLTAGE REGULATED POWER SUPPLY

(75) Inventors: Eric Smith, San Jose, CA (US); P. Jeffrey Ungar, Sunnyvale, CA (US); Heather R. Sullens, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 426 days.

(21) Appl. No.: 13/090,128

(22) Filed: Apr. 19, 2011

(65) Prior Publication Data
US 2012/0195080 A1    Aug. 2, 2012

Related U.S. Application Data

(60) Provisional application No. 61/436,891, filed on Jan. 27, 2011.

(51) Int. Cl.
G05F 1/563    (2006.01)
(52) U.S. Cl.
USPC ............................. 323/266; 323/273; 363/61
(58) Field of Classification Search
USPC ..................................... 323/266, 273; 363/61
See application file for complete search history.

(56) References Cited

U.S. PATENT DOCUMENTS

| 4,745,520 A | * | 5/1988 | Hughey | 361/228 |
| 4,825,351 A | | 4/1989 | Uesugi | |
| 6,856,124 B2 | | 2/2005 | Dearn | |
| 7,005,625 B1 | * | 2/2006 | Mitchell | 250/207 |
| 7,199,567 B2 | | 4/2007 | Eberlein | |
| 7,907,430 B2 | * | 3/2011 | Kularatna et al. | 363/59 |
| 8,111,054 B2 | * | 2/2012 | Yen et al. | 323/266 |
| 2010/0296320 A1 | | 11/2010 | Fober | |
| 2011/0103554 A1 | * | 5/2011 | Charette et al. | 378/138 |
| 2012/0195080 A1 | * | 8/2012 | Smith et al. | 363/61 |
| 2013/0156160 A1 | * | 6/2013 | Vadivel et al. | 378/104 |

* cited by examiner

*Primary Examiner* — Jeffrey Sterrett
(74) *Attorney, Agent, or Firm* — Park, Vaughan, Fleming & Dowler LLP; Steven E. Stupp

(57) ABSTRACT

The disclosed embodiments relate to a power-supply circuit, an electronic device that includes the power-supply circuit, and a method for generating high-voltage DC power from AC line power using the power-supply circuit. This power-supply circuit includes a voltage multiplier and a low dropout (LDO) regulator, and does not include a step-up transformer. Conventional power supplies often use a custom step-up transformer, which is expensive unless the power supplies are manufactured in high quantities. In contrast, one embodiment of the present disclosure provides a solid-state implementation of a 700 V regulated power supply that can take up to a 1020 V input from an 6× voltage multiplier powered from the AC mains. Hence, the disclosed power-supply circuit eliminates the need for large, heavy and expensive step-up transformers and chokes that are used in conventional high-voltage DC power supplies.

21 Claims, 4 Drawing Sheets

HIGH-VOLTAGE REGULATED POWER SUPPLY

CROSS REFERENCE TO RELATED APPLICATION

This application claims priority under 35 U.S.C. §119(e) to U.S. Provisional Patent Application Ser. No. 61/436,891, entitled "High Voltage DC Power Supply Using Voltage Multiplier with Feedback Regulation," by Eric Smith, P. Jeffrey Ungar and Heather Sullens, filed on Jan. 27, 2011, the contents of which are herein incorporated by reference.

BACKGROUND

1. Field

The disclosed embodiments generally relate to power supplies. More specifically, the disclosed embodiments relate to the design of a high-voltage DC power supply, which is powered by an AC line, and which operates without using a step-up transformer.

2. Related Art

High-voltage DC power supplies that provide moderate power output are commonly used in a number of applications, such as: lasers, photographic flash units, displays and audio tube amplifiers. These high-voltage power supplies typically step up the AC line voltage by using a step-up transformer as the first stage before rectification and filtering to generate a DC output. However, in order to operate effectively at the line frequency, the step-up transformer generally needs to be large and heavy. Furthermore, the step-up transformer is likely to be an expensive custom component, because such step-up transformers are not widely used.

Hence, what is needed is a high-voltage DC power supply that does not require such a step-up transformer.

SUMMARY

The disclosed embodiments relate to a method for generating high-voltage DC power from AC line power using a power-supply circuit. This power-supply circuit includes a voltage multiplier and a low dropout (LDO) regulator, and does not include a step-up transformer. Conventional power supplies often use a custom step-up transformer, which is expensive unless the power supplies are manufactured in high quantities. In contrast, one embodiment of the present disclosure provides a solid-state implementation of a 700 V regulated power supply that can take up to a 1020 V input from a six-times voltage multiplier powered from the AC mains. Hence, the disclosed power-supply circuit eliminates the need for large, heavy and expensive step-up transformers and chokes that are used in conventional high-voltage DC power supplies.

Note that, designs for stand-alone voltage multipliers and LDO regulators are fairly well known, it can be quite challenging to regulate the output voltage of a voltage multiplier. Moreover, existing LDO regulator designs are not configured to operate at high voltages and power levels.

The power-supply circuit includes several features that facilitate operation under these conditions, including diodes having opposite polarities that clamp a differential voltage across the gates of a differential amplifier in a first stage of the LDO regulator during turn on. Moreover, a level-shifting circuit with a set of series-coupled diodes in a second stage of the LDO regulator shifts an output voltage from the differential amplifier to a larger intermediate voltage, thereby setting a gain of a power transistor in a third stage of the LDO regulator without exceeding a breakdown voltage of a transistor in the second stage. The third stage also includes a divider network with passive components that specify the DC output voltage, and which is electrically coupled to the differential amplifier in the first stage, thereby providing negative feedback to the differential amplifier. Furthermore, the output impedance of the divider network allows the power transistor to provide an approximately constant output power into a load over a range of audible frequencies (such as up to 10-20 kHz). Note that the power-supply circuit may include an input transformer that electrically isolates an input of the voltage multiplier from the AC line.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
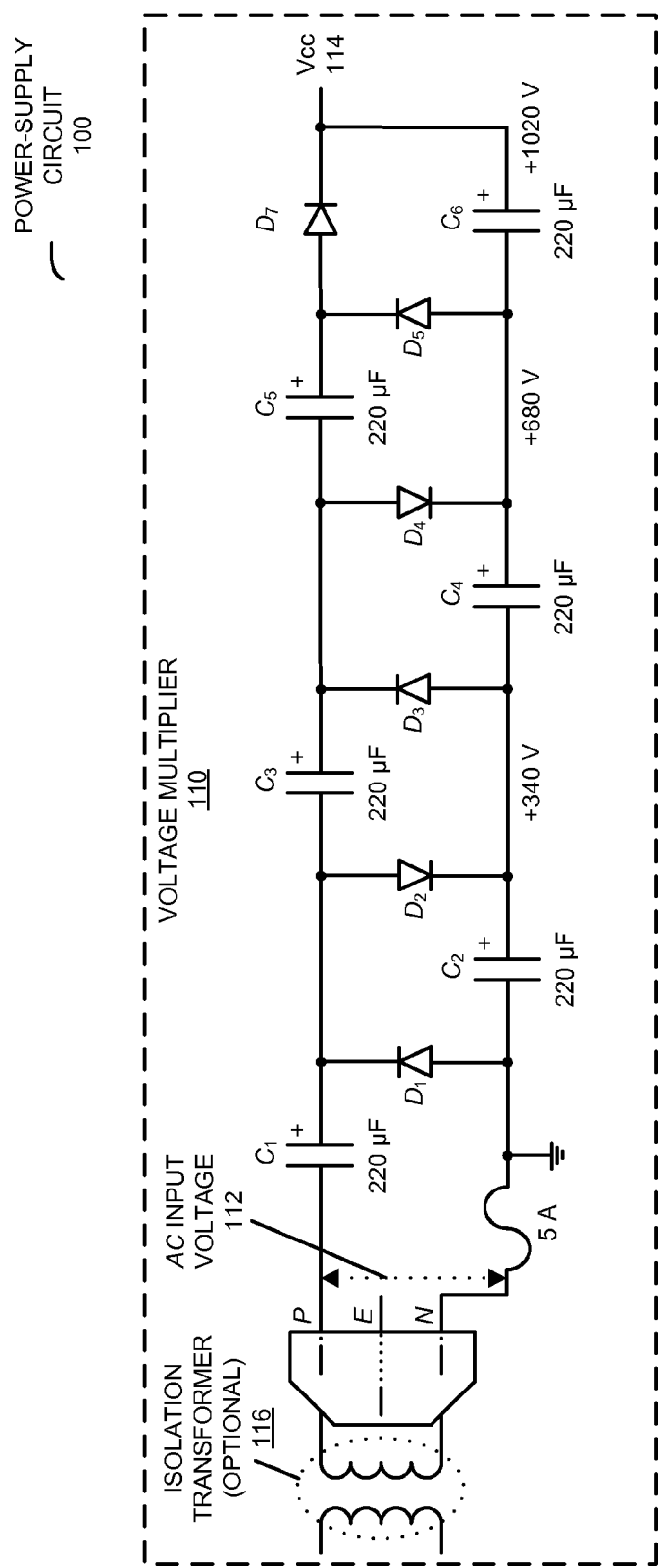
FIG. 1 is a block diagram illustrating a voltage multiplier in a power-supply circuit in accordance with an embodiment of the present disclosure.

Instead of using a custom step-up transformer to increase the voltage, the power-supply circuit in the present disclosure feeds AC power through a three-stage, half-wave Cockcroft-Walton multiplier which bumps the line voltage up above 1 kV (for example, to 1020 V). This is shown in FIG. 1, which presents a block diagram illustrating a voltage multiplier 110 (in this example, a Cockcroft-Walton multiplier) in power-supply circuit 100.

The Cockcroft-Walton multiplier uses only capacitors and diodes to produce a rectified and filtered output voltage Vcc 114, which is a multiple of the peak AC input voltage 112. In particular, when the voltages on capacitors $C_1$, $C_3$ and $C_5$ on the top of voltage multiplier 110 (which are charged by the AC line voltage) exceed the voltage thresholds of the diodes (which act as unidirectional switches), charge flows into (and is held by) $C_2$, $C_4$ and $C_6$ on the bottom of voltage multiplier 110. Thus, $C_1$, $C_3$ and $C_5$ dump charge into $C_2$, $C_4$ and $C_6$, and $C_2$, $C_4$ and $C_6$ provide a voltage offset to the next stage in voltage multiplier 110 (each stage in voltage multiplier 110 provides an additional two-times multiplication). As the AC line current alternates, $C_2$, $C_4$ and $C_6$ lift or pump up the voltage in both directions (because p can go below n), thereby providing a rectified output voltage. Note that the high-voltage diodes and high-voltage capacitors in FIG. 1 are readily available.

One problem with using a Cockcroft-Walton multiplier at the AC line frequency is that under load the output of this voltage multiplier can dip substantially and has significant ripple (much more than a conventional step-up transformer with rectified and filtered output). Moreover, when used in conjunction with an AC line voltage, the ripple is at 60 Hz, which is audible. Additional filtering can be added to reduce the ripple under load to acceptable levels. However, because of the output impedance of voltage multiplier 110, the output-voltage level will remain sensitive to the AC line voltage level and the load.

What is needed is an additional stage of active regulation that incorporates a reference so that a stable, low-ripple DC output voltage can be maintained for changing AC line voltage and changing loads. To achieve this end, power-supply circuit 100 includes a feedback regulator with the voltage referenced to the output of voltage multiplier 110.

Figure 2:
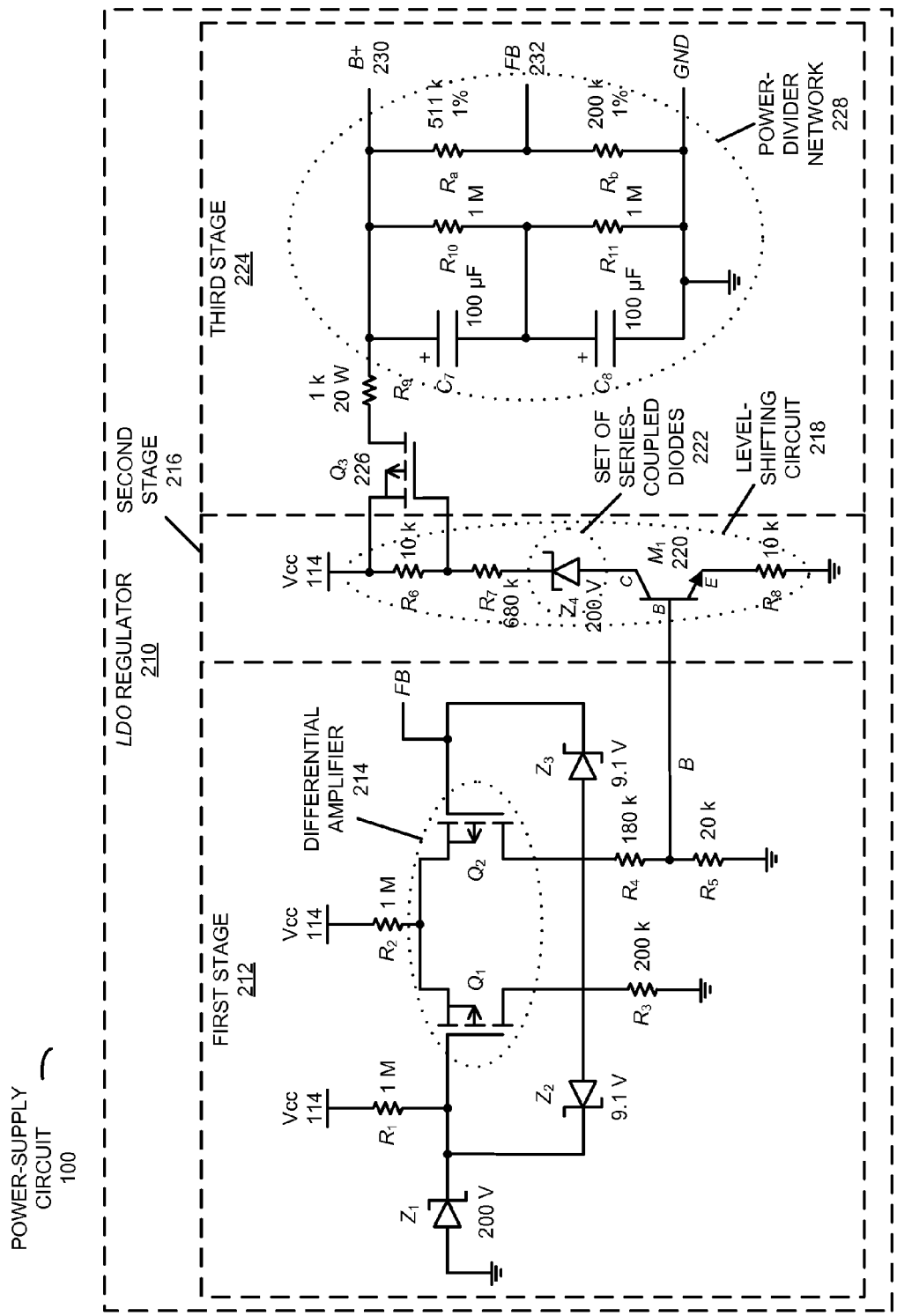
FIG. 2 is a block diagram illustrating a low dropout (LDO) regulator in the power-supply circuit of FIG. 1 in accordance with an embodiment of the present disclosure.

This is shown in FIG. 2, which presents a block diagram illustrating an LDO regulator 210 in power-supply circuit 100. LDO regulator 210 is a feedback regulator that includes a high-voltage first stage 212 that includes a differential amplifier 214, which feeds through to a second stage 216 with a level-shifting circuit 218. The output of level-shifting circuit 218 specifies a gain of a power transistor $Q_3$ 226 in a third stage 224. This third stage also includes a high power-divider network 228 (such as a passive voltage divider) that provides a filtered and amplified DC output voltage B+ 230 relative to AC input voltage 112 in FIG. 1 (for example, 700 V), as well as a voltage FB 232 corresponding to DC output voltage B+ 230. This voltage is compared to a reference voltage (which is provided by resistor $R_1$ and Zener diode $Z_1$) by differential amplifier 214, thereby providing negative feedback.

LDO regulator 210 includes a number of features to solve problems that occur at high voltages, including: (1) turn-on problems; and (2) a low output impedance so that power transistor $Q_3$ 226 can provide an approximately constant output power into a load over audible frequencies, such as up to 10-20 kHz. (Thus, the resistances in the design need to be small enough so that third stage 224 has sufficient bandwidth to provide high power and to regulate over audio frequencies.)

In particular, $R_2$ protects differential amplifier 214 even if Vcc 114 is very large. (Thus, differential amplifier 214 floats relative to the resistors so power-supply circuit 100 can operate safely at high voltages.) Because of the negative feedback, during normal operation the gates of the transistors in differential amplifier 214 are at similar voltages. However, when power-supply circuit 100 is first turned on, there is no voltage on DC output voltage B+ 230, while the voltage on $Z_1$ is approximately 200 V, which will destroy the transistors in differential amplifier 214. To prevent this, the gates of these transistors are electrically coupled by $Z_2$ and $Z_3$ with opposite polarities, which clamp a differential voltage across the gates during turn on of power-supply circuit 100.

In second stage 216, level-shifting circuit 218 includes an npn transistor $M_1$ 220 having: a gate coupled to an output of differential amplifier 214; an emitter coupled to ground; and a collector coupled to set of series-coupled diodes 222, which can include at least one diode. This set of series-coupled diodes shifts an output voltage from differential amplifier 214 to a larger intermediate voltage. This intermediate voltage specifies a gain $V_{GX}$ of power transistor $Q_3$ 226 with a differential voltage across the collector and the emitter that is less than a $V_{CE}$ breakdown voltage of this transistor.

Level-shifting circuit 218 works as follows. First, note that the resistances $R_6$ and $R_8$ are the same, and the mirror current in differential amplifier 214 and on npn transistor $M_1$ 220 are similar (for a reasonable value of β for this transistor, they are almost the same). $R_4$ and $R_5$ are selected so that $R_5$ and $R_8$ are at the same voltage (or similar voltages). Then, if differential amplifier 214 is balanced because of negative feedback, the voltage on $R_3$ is similar to the voltages on $R_4$ and $R_5$. Because of level-shifting circuit 218, the voltages on $R_6$ and $R_8$ are similar, so the nominal gain $V_{GX}$ for power transistor $Q_3$ 226 can be specified. Moreover, even though $R_8$ is the ground reference, by using level-shifting circuit 218 it is shifted to a level that can control the gate voltage of power transistor $Q_3$ 226. Note that $R_6$ is referenced to high voltage Vcc 114.

LDO regulator 210 has reasonable gain at audio frequencies (up to 10-20 kHz). But large power transistors have large gate capacitance, so $R_6$ cannot be large. However, if $R_6$ is small there is a small associated voltage drop. In this case, the maximum $V_{CE}$ of npn transistor $M_1$ 220 would need to be very large. To avoid this, Zener diode(s) in set of series-coupled diodes 222 are used to shift the voltage level up. These diodes provide an AC short for currents and transients in one direction, and can hold voltage in the other direction. This set of series-coupled diodes can include multiple Zener diodes, such as $Z_4$ (each of which has a 200 V drop). This feature allows power-supply circuit 100 to maintain its high-frequency response.

Note that power transistor $Q_3$ 226 is where the voltage drops as the load current changes. To maintain DC output voltage B+ 230 when this occurs, power transistor $Q_3$ 226 dynamically changes its effective impedance.

Furthermore, DC output voltage B+ 230 equals a voltage reference times power-divider network 228, so different DC output voltages can be selected. This power-divider network 228 also includes features that facilitate operation at high voltages. $C_7$ and $C_8$ (which each may have breakdown voltages of 300-400 V) are stacked so that they do not blow up. However, these capacitors cannot take the full voltage drop if the circuit assumptions are wrong (such as during turn off). Consequently, $R_9$ and $R_{10}$ are used to maintain half of the voltage drop on each of these capacitors during turn off.

Additionally, voltage FB 232 is the feedback point. It provides this voltage to differential amplifier 214.

As described previously, power-divider network 228 may have an output impedance less than a predefined value, thereby allowing power transistor $Q_3$ 226 to provide an approximately constant output power into a load over audible frequencies.

Note that LDO regulator 210 uses readily available components yet successfully operates in the 1 kV range. For example, using the AC line as the input, DC output voltage B+ 230 may be at least five times larger than a root-mean-square value of AC input voltage 112 (FIG. 1).

In an exemplary embodiment, voltage multiplier 110 (FIG. 1) uses diode model STTH512FP (provided by STMicroelectronics, N.V., of Geneva, Switzerland). Moreover, LDO regulator 210 may use Zener diode model 1N5388B (provided by Freescale Semiconductor, of Austin, Tex.), transistors $Q_t$ and $Q_2$ in differential amplifier 214 and power transistor $Q_3$ 226 may be model MTB2P50E (provided by Freescale Semiconductor, of Austin, Tex.), and transistor $M_1$ may be model BUH50 (provided by Freescale Semiconductor, of Austin, Tex.). In addition, power transistor $Q_3$ 226 may require a heat sink.

Hence, power-supply circuit 100 in the present disclosure combines voltage multiplier 110 in FIG. 1 (which provides a rectified, somewhat-filtered DC voltage Vcc 114) plus an LDO regulator 210 (which regulates Vcc 114 to provide DC output voltage B+ 230) that produces moderate power output and operates using AC input voltage 112 (FIG. 1). This voltage multiplier may be similar in size to a more conventional voltage multiplier that includes a custom transformer plus rectifier and filtration components, but is less expensive and, certainly, is much less massive. Power-supply circuit 100 has very good power-supply noise rejection without using an L-C network (which typically has a large output impedance). Thus, power-supply circuit 100 provides good filtering and a low output impedance.

Figure 3:
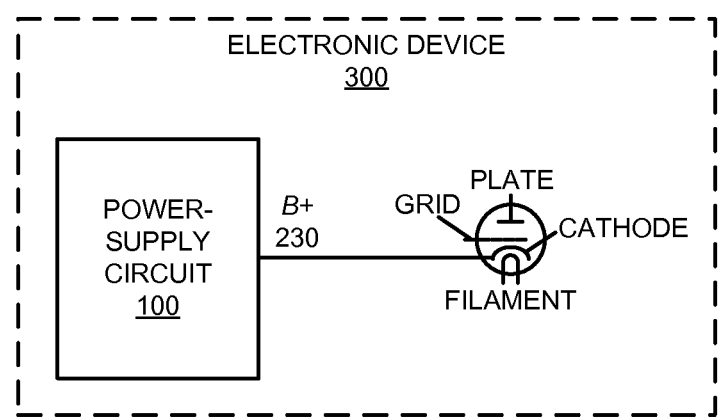
FIG. 3 is a block diagram illustrating an electronic device that includes the power-supply circuit of FIGS. 1 and 2 in accordance with an embodiment of the present disclosure.

FIG. 3 presents a block diagram illustrating an electronic device 300 that includes power-supply circuit 100. In this electronic device, power-supply circuit 100 drives a vacuum-tube load. In particular, the DC output voltage B+ 230 is electrically coupled to the tube collector.

Although power-supply circuit 100 (FIGS. 1 and 2) and electronic device 300 are illustrated as having a number of discrete items, these embodiments are intended to be a functional description of the various features that may be present rather than a structural schematic of the embodiments described herein. In some embodiments, some or all of the functionality of power-supply circuit 100 (FIGS. 1 and 2) and/or electronic device 300 may be implemented in one or more mixed signal integrated circuits.

More generally, power-supply circuit 100 may be used in a wide variety of applications, including: lasers, photographic flash units, displays and audio tube amplifiers. Furthermore, electronic device 300 may include a computing device, such as: a personal computer, a laptop computer, a tablet computer, a cellular phone, a personal digital assistant, a server and/or a client computer (in a client-server architecture).

Power-supply circuit 100 (FIGS. 1 and 2) and/or electronic device 300 may include fewer components or additional components. For example, LDO regulator 210 (FIG. 2) can also be applied to the filtered, rectified output of a step-up transformer. Alternatively or additionally, for specific applications the above-described voltage multiplier may be fed from the output of an optional isolation transformer 116 (FIG. 1) that isolates an input of voltage multiplier 110 (FIG. 1) from a source of AC input voltage 112 (FIG. 1), but such isolation transformers are small and widely available.

The Cockcroft-Walton multiplier could also be a full-wave version using an isolation transformer with a center-tapped secondary. This full-wave version can provide less ripple. Moreover, the full-wave version may include twice as many diodes and 1.5 times the number of capacitors as the half-wave version shown in FIG. 1, but these components may have smaller values.

While the aforementioned embodiments illustrated power-supply circuit 100 (FIGS. 1 and 2) using a particular configuration of a Cockcroft-Walton multiplier and LDO regulator 210 (FIG. 2), a variety of configurations may be used, including a Cockcroft-Walton multiplier with fewer or additional multiplication stages and/or additional diodes in set of series-coupled diodes 222 (FIG. 2) in level-shifting circuit 218 (FIG. 2). Furthermore, other voltage multipliers and/or regulators may be used in power-supply circuit 100 (FIGS. 1 and 2).

In power-supply circuit 100 (FIGS. 1 and 2) and/or electronic device 300, two or more components may be combined into a single component, and/or a position of one or more components may be changed. Note that the functionality of power-supply circuit 100 (FIGS. 1 and 2) and/or electronic device 300 may be implemented using n-type, p-type, CMOS, bipolar, vacuum tube, discrete and/or integrated components, as is known in the art.

While some components are shown directly connected to one another in the preceding embodiments, others are shown connected via intermediate components. Nonetheless, electrical coupling may be accomplished using a number of circuit configurations, as is known in the art. For example, these embodiments can support AC and DC coupling between components.

Figure 4:
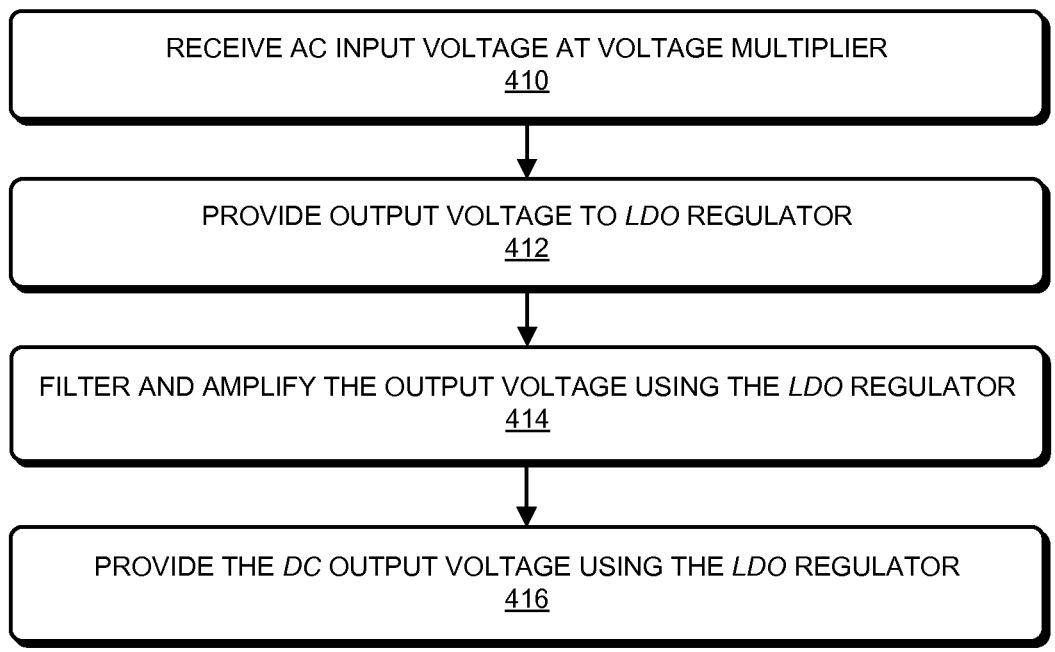
FIG. 4 is a flow diagram illustrating a method for providing a DC output voltage using the power-supply circuit of FIGS. 1 and 2 in accordance with an embodiment of the present disclosure.

FIG. 4 presents a flow diagram illustrating a method 400 for providing a DC output voltage using power-supply circuit 100 (FIGS. 1 and 2). During this method, the voltage multiplier in the power-supply circuit receives the AC input voltage (operation 410) and provides the output voltage to the LDO regulator in the power-supply circuit (operation 412). Then, the LDO regulator filters and amplifies the output voltage (operation 414). Moreover, the LDO regulator provides the DC output voltage (operation 416), where the power-supply circuit excludes a step-up transformer.

In some embodiments of method 400 there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A power-supply circuit, comprising:
   a voltage multiplier configured to receive an AC input voltage and to provide an output voltage; and
   a low dropout (LDO) regulator electrically coupled to the voltage multiplier, wherein the LDO regulator is configured to filter and amplify the output voltage to provide a DC output voltage, wherein the power-supply circuit excludes a step-up transformer.

2. The power-supply circuit of claim 1, wherein the voltage multiplier includes a Cockcroft-Walton multiplier.

3. The power-supply circuit of claim 1, wherein the LDO regulator includes a first stage with a differential amplifier that compares a voltage corresponding to the DC output voltage to a reference voltage; and
   wherein gates of transistors in the differential amplifier are electrically coupled by diodes having opposite polarities, which clamp a differential voltage across the gates during turn on of the power-supply circuit.

4. The power-supply circuit of claim 3, wherein the LDO regulator includes a second stage with a level-shifting circuit;
   wherein the level-shifting circuit includes a transistor having:
      a gate coupled to an output of the differential amplifier;
      a first terminal coupled to ground; and
      a second terminal coupled to a set of series-coupled diodes, which can include at least one diode; and
   wherein the set of series-coupled diodes shifts an output voltage from the differential amplifier to a larger intermediate voltage.

5. The power-supply circuit of claim 4, wherein the LDO regulator includes a third stage with a power transistor, electrically coupled to the second stage, and a divider network;
   wherein the divider network includes passive components that specify the DC output voltage; and
   wherein the divider network is electrically coupled to the differential amplifier in the first stage, thereby providing negative feedback to the differential amplifier.

6. The power-supply circuit of claim 5, wherein the intermediate voltage specifies a gain of the power transistor with a differential voltage across the first terminal and the second terminal of the transistor that is less than a breakdown voltage of the transistor.

7. The power-supply circuit of claim 5, wherein the divider network has an output impedance less than a predefined value, thereby allowing the power transistor to provide an approximately constant output power into a load over a range of frequencies audible to humans.

8. The power-supply circuit of claim 1, wherein the LDO regulator floats with respect to ground.

9. The power-supply circuit of claim 1, wherein the AC input voltage includes a line voltage and the DC output voltage is at least five times larger than a root-mean-square value of the AC input voltage.

10. The power-supply circuit of claim 1, further comprising an input transformer electrically coupled to the voltage multiplier, wherein the input transformer is configured to electrically isolate an input of the voltage multiplier from a source of the AC input voltage.

11. An electronic device, comprising a power-supply circuit, wherein the power-supply circuit includes:
   a voltage multiplier configured to receive an AC input voltage and to provide an output voltage; and
   a low dropout (LDO) regulator electrically coupled to the voltage multiplier, wherein the LDO regulator is configured to filter and amplify the output voltage to provide a DC output voltage, wherein the power-supply circuit excludes a step-up transformer.

12. The electronic device of claim 11, wherein the voltage multiplier includes a Cockcroft-Walton multiplier.

13. The electronic device of claim 11, wherein the LDO regulator includes a first stage with a differential amplifier that compares a voltage corresponding to the DC output voltage to a reference voltage; and
   wherein gates of transistors in the differential amplifier are electrically coupled by diodes having opposite polarities, which clamp a differential voltage across the gates during turn on of the power-supply circuit.

14. The electronic device of claim 13, wherein the LDO regulator includes a second stage with a level-shifting circuit;
   wherein the level-shifting circuit includes a transistor having:
      a gate coupled to an output of the differential amplifier;
      a first terminal coupled to ground; and
      a second terminal coupled to a set of series-coupled diodes, which can include at least one diode; and
   wherein the set of series-coupled diodes shifts an output voltage from the differential amplifier to a larger intermediate voltage.

15. The electronic device of claim 14, wherein the LDO regulator includes a third stage with a power transistor, electrically coupled to the second stage, and a divider network;
   wherein the divider network includes passive components that specify the DC output voltage; and
   wherein the divider network is electrically coupled to the differential amplifier in the first stage, thereby providing negative feedback to the differential amplifier.

16. The electronic device of claim 15, wherein the intermediate voltage specifies a gain of the power transistor with a differential voltage across the first terminal and the second terminal of the transistor that is less than a breakdown voltage of the transistor.

17. The electronic device of claim 15, wherein the divider network has an output impedance less than a predefined value, thereby allowing the power transistor to provide an approximately constant output power into a load over a range of frequencies audible to humans.

18. The electronic device of claim 11, wherein the LDO regulator floats with respect to ground.

19. The electronic device of claim 11, wherein the AC input voltage includes a line voltage and the DC output voltage is at least five times larger than a root-mean-square value of the AC input voltage.

20. The electronic device of claim 11, further comprising an input transformer electrically coupled to the voltage multiplier, wherein the input transformer is configured to electrically isolate an input of the voltage multiplier from a source of the AC input voltage.

21. A method for providing a DC output voltage using a power-supply circuit, comprising:
   receiving an AC input voltage using a voltage multiplier in the power-supply circuit;
   providing, using the voltage multiplier, an output voltage to an LDO regulator in the power-supply circuit;
   filtering and amplifying the output voltage using the LDO regulator; and
   providing the DC output voltage using the LDO regulator, wherein the power-supply circuit excludes a step-up transformer.

* * * * *